United States Patent
Chou et al.

(10) Patent No.: US 11,840,747 B1
(45) Date of Patent: Dec. 12, 2023

(54) ALUMINUM ALLOY MATERIAL, ALUMINUM ALLOY OBJECT AND METHOD FOR MANUFACTURING THE SAME

(71) Applicant: INDUSTRIAL TECHNOLOGY RESEARCH INSTITUTE, Hsinchu (TW)

(72) Inventors: Yu-Hsien Chou, Tainan (TW); Chi-San Chen, Kaohsiung (TW); Heng-Yi Tsai, Yuanlin (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/994,590

(22) Filed: Nov. 28, 2022

(30) Foreign Application Priority Data

Oct. 21, 2022 (TW) .................................. 111140025

(51) Int. Cl.
| | |
|---|---|
| *C22C 21/02* | (2006.01) |
| *C22C 1/04* | (2023.01) |
| *C25D 11/04* | (2006.01) |
| *B22F 10/28* | (2021.01) |
| *B33Y 70/00* | (2020.01) |
| *B33Y 10/00* | (2015.01) |

(52) U.S. Cl.
CPC ............. *C22C 21/02* (2013.01); *B22F 10/28* (2021.01); *C22C 1/0416* (2013.01); *C25D 11/04* (2013.01); *B33Y 10/00* (2014.12); *B33Y 70/00* (2014.12)

(58) Field of Classification Search
CPC .................................................. C22C 21/02
See application file for complete search history.

(56) References Cited

U.S. PATENT DOCUMENTS

| | | | |
|---|---|---|---|
| 4,450,207 A | 5/1984 | Donomoto et al. | |
| 6,065,534 A | 5/2000 | Sircar | |
| 6,355,090 B1 * | 3/2002 | Ohyama | C22C 21/02 |
| | | | 420/536 |
| 6,466,444 B2 | 10/2002 | Cheung | |
| 7,592,695 B2 | 9/2009 | Reis et al. | |
| 8,292,589 B2 | 10/2012 | Koga | |
| 10,919,811 B2 | 2/2021 | Yuasa et al. | |
| 2005/0106410 A1 * | 5/2005 | Jiang | B23K 35/286 |
| | | | 428/654 |
| 2014/0096879 A1 | 4/2014 | Kim | |
| 2016/0130686 A1 | 5/2016 | Kim | |

FOREIGN PATENT DOCUMENTS

| | | |
|---|---|---|
| CN | 105112743 A | 12/2015 |
| CN | 107164664 A | 9/2017 |
| CN | 110878396 A | 3/2020 |
| CN | 108330344 B | 8/2020 |
| CN | 112048647 A | 12/2020 |
| CN | 113528901 B | 3/2022 |
| TW | I305131 B | 1/2009 |
| TW | 201139696 A1 | 11/2011 |
| TW | I361836 B | 4/2012 |
| TW | I383053 B | 1/2013 |
| TW | I465580 B | 12/2014 |
| TW | I468527 B | 1/2015 |
| TW | I510638 B | 12/2015 |
| TW | I558551 B | 11/2016 |
| TW | I615480 B | 2/2018 |
| TW | 201928079 A | 7/2019 |
| TW | 202111136 A | 3/2021 |
| TW | I752893 B | 1/2022 |

OTHER PUBLICATIONS

Runge, Anodizing, ASM Handbook, vol. 2A, Aluminum Science and Technology, 2018 (Year: 2018).*
Office Action dated Aug. 25, 2023, in Taiwan Patent Application No. 111140025.

* cited by examiner

*Primary Examiner* — Christopher S Kessler
(74) *Attorney, Agent, or Firm* — Birch, Stewart, Kolasch & Birch, LLP

(57) ABSTRACT

An aluminum alloy material includes 1.2 wt % to 3.0 wt % of Si, 0.1 wt % to 0.8 wt % of Mg, 0.2 wt % to 2.0 wt % of Cu, 0.5 wt % to 2.5 wt % of Zn, 0.2 wt % to 2.0 wt % of Ti, and the remainder being Al and inevitable impurities. The powder of the aluminum alloy material can be processed to form an aluminum alloy object. The aluminum alloy object may further include an anodized film on its surface.

9 Claims, No Drawings

ALUMINUM ALLOY MATERIAL, ALUMINUM ALLOY OBJECT AND METHOD FOR MANUFACTURING THE SAME

CROSS REFERENCE TO RELATED APPLICATIONS

The present application is based on, and claims priority from, Taiwan Application Serial Number 111140025, filed on Oct. 21, 2022, the disclosure of which is hereby incorporated by reference herein in its entirety.

TECHNICAL FIELD

The technical field relates to an aluminum alloy material, and in particular it relates to the aluminum alloy material for 3D printing.

BACKGROUND

The components of the semiconductor manufacturing equipment are mainly made of aluminum alloy (with corrosion resistance, easy processing, anodizable, and lightweight) that is post-processed. Global semiconductor companies face the problems of supplying materials, complex geometries, and stable process production for a long time. How to effectively improve the regional producing, scheduling, and supporting the global semiconductor components becomes a difficult problem for semiconductor manufacturing equipment manufacturers and their customers. Metal 3D printing has excellent properties such as unlimited product geometry, near-net shape semi-finished product, advanced digital production, and the likes, which not only reduces the process steps of traditional metal industry but also eliminates inventory.

However, the 3D printing has a stricter requirement on the raw materials. For satisfying the suitability requirements of laser 3D printing, the selected material needs to be provided in powder form. The powder material is quickly melted and then recombined. The process is related to physical state changes such as rapid melting and solidification of the material, such that the property demands of the applicable materials is extremely high.

The spare components of the semiconductor manufacturing equipment not only need light weight and high intensity, but also need to be anodized to enhance corrosion resistance for avoiding the corrosion of components in the semiconductor manufacturing equipment (which may release metal elements to contaminate the wafer). The major aluminum alloy powder for 3D printing is $AlSi_{10}Mg$. $AlSi_{10}Mg$ has high silicon content and large potential difference between Al and Si, and the microstructure of its anodized film is not dense and uniform. As such, the anodized film of $AlSi_{10}Mg$ is easily degraded to have defects, and the corrosion resistance is therefore reduced. Accordingly, $AlSi_{10}Mg$ cannot serve as the material of the spare components in the semiconductor manufacturing equipment.

Currently, 6061 aluminum alloy is still used as the material for the spare components in the semiconductor industry, which can be anodized to form a uniform colorless or pale-color anodized film due to low silicon content (e.g. 0.4 wt % to 0.8 wt %) of 6061 aluminum alloy. However, the solid-liquid two phase of 6061 aluminum alloy has a narrow temperature range. As such, 6061 aluminum alloy has a poor die-casting performance and is not suitable for 3D printing.

Accordingly, a novel aluminum alloy material is called for to satisfy the specification requirement of the components of semiconductor manufacturing equipment, such as being 3D-printable, being anodizable, and having certain specific mechanical properties.

SUMMARY

One embodiment of the disclosure provides an aluminum alloy material, including: 1.2 wt % to 3.0 wt % of Si; 0.1 wt % to 0.8 wt % of Mg; 0.2 wt % to 2.0 wt % of Cu; 0.5 wt % to 2.5 wt % of Zn; 0.2 wt % to 2.0 wt % of Ti; and the remainder being Al and inevitable impurities.

In some embodiments, the aluminum alloy material includes 1.6 wt % to 2.0 wt % of Si; 0.3 wt % to 0.5 wt % of Mg; 0.5 wt % to 1.5 wt % of Cu; 1.0 wt % to 2.0 wt % of Zn; 0.8 wt % to 1.6 wt % of Ti; and the remainder being Al and inevitable impurities.

One embodiment provides an aluminum alloy object formed by processing a powder of the described aluminum alloy material.

In some embodiments, the powder of the aluminum alloy material has a diameter of 20 micrometers to 65 micrometers.

In some embodiments, the processing includes 3D printing, die casting, forging, welding, or milling.

In some embodiments, the aluminum alloy object further includes an anodized film formed on the surface of the aluminum alloy object.

One embodiment of the disclosure provides a method of forming an aluminum alloy object, including processing a powder of the aluminum alloy material to form the aluminum alloy object.

In some embodiments, the powder of the aluminum alloy material has a diameter of 20 micrometers to 65 micrometers.

In some embodiments, the processing includes 3D printing, die casting, forging, welding, or milling.

In some embodiments, the method further includes anodizing the aluminum alloy object to form an anodized film on the surface of the aluminum alloy object.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides an aluminum alloy material, including: 1.2 wt % to 3.0 wt % of Si; 0.1 wt % to 0.8 wt % of Mg; 0.2 wt % to 2.0 wt % of Cu; 0.5 wt % to 2.5 wt % of Zn; 0.2 wt % to 2.0 wt % of Ti; and the remainder being of Al and inevitable impurities. In some embodiments, the aluminum alloy material includes 1.6 wt % to 2.0 wt % of Si; 0.3 wt % to 0.5 wt % of Mg; 0.5 wt % to 1.5 wt % of Cu; 1.0 wt % to 2.0 wt % of Zn; 0.8 wt % to 1.6 wt % of Ti; and the remainder being Al and inevitable impurities. If the Si amount is too high, the segregation will be easily occurred, and the anodized film of the aluminum alloy will be prone to defects to degrade the compactness, which may lower its corrosion resistance. If the Si amount is too low, the aluminum alloy will have a poor melt castability, and the shaped object will be prone to have inside defects such as shrinkage pores and cracks. If the Mg amount is too high, the ductility of the aluminum alloy will be degraded due to too much Mg$_2$Si strengthening phase. If the Mg amount is too low, the mechanical strength of the aluminum alloy will be low. If the Cu amount is too high, the corrosion resistance of the aluminum alloy will be lowered. If the Cu amount is too low, the hardness of the aluminum alloy base cannot be enhanced. If the Zn amount is too high, the elongation rate of the aluminum alloy cannot be efficiently enhanced. If the Zn amount is too low, the ultimate tensile strength and corrosion resistance of the aluminum alloy cannot be enhanced. If the Ti amount is too high, the welding slag of the 3D printing shaped aluminum alloy object will be too much, which will be wrapped inside the object to generate defects to lower the elongation rate of the object. If the Ti amount is too low, the tensile strength of the 3D printing shaped aluminum alloy object will be insufficient, and the elongation rate of the aluminum alloy object will be low or even cannot be elongated (brittle and broken).

One embodiment of the disclosure provides an aluminum alloy object, which is formed by processing a powder of the described aluminum alloy material. In some embodiments, the powder of the aluminum alloy material has a diameter of 20 micrometers to 65 micrometers. If the diameter of the powder of the aluminum alloy material is too large, the surface roughness of the 3D printing shaped object will be too large. If the diameter of the powder of the aluminum alloy material is too small, the powder will be prone to aggregate to degrade the uniformity of the powder layer during the 3D printing, and the 3D printing shaped object will have a non-uniform compactness. For example, the processing includes 3D printing, die casting, forging, welding, or milling. In practice, when a component in the semiconductor manufacturing equipment is broken, the powder of the described aluminum alloy material can be directly 3D printed to form an aluminum alloy object to replace the broken components. As such, the space and cost of storing the spare components can be saved. Alternatively, the difficulty of storing the powder of the aluminum alloy material before 3D printing is also lower than the difficulty of storing the shaped components. Accordingly, 3D printing the powder of the aluminum alloy material to form the aluminum alloy object as the components in the semiconductor manufacturing equipment, may efficiently reduce the cost of repairing the semiconductor manufacturing equipment, and reduce the associated cost of the semiconductor products.

Alternatively, the aluminum alloy material of the disclosure can be processed by the method other than 3D printing, such as die casting, forging, welding, or milling to form the object. When the geometry shape of the object is simple, the other processing of lower cost can be adopted to save the manufacture cost.

In some embodiments, the aluminum alloy object further includes an anodized film formed on its surface. For example, the processed and shaped aluminum alloy object can be anodized to form the anodized film on its surface. The anodized film may further protect the aluminum alloy object from corrosion.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

In following Examples, the aluminum alloy material was heated to 800° C. and pressured to about 22 bar for being atomized, and then sprayed and cooled at a flow rate of about 4.5 m$^3$/min to form a powder of the aluminum alloy material with a consistent composition. The powder of the aluminum alloy material can be 3D printed to form an aluminum alloy object by a 3D printing equipment of metal powder bed type (AMP-160, commercially available from Tongtai Machine & Tool Co., Ltd.), in which the scan rate was 1200 mm/second, the scan power was 350 W, each of the aluminum alloy powder layer had a thickness of 30 micrometers, and the hatch spacing was 50 micrometers. In following Examples, the ultimate tensile strength (UTS) of the aluminum alloy object was measured according to the standard ASTM E8, and the elongation rate of the aluminum alloy object was measured according to the standard ASTM E8, and the compactness of the aluminum alloy object was measured according to the standard ASMT B962.

Comparative Example 1-1

The commercially available 6061 aluminum alloy powder was extrusion processed to form an aluminum alloy object. The aluminum alloy object has a uniform metallographic phase and a compactness of 99.1%. However, the aluminum alloy object shaped by extrusion processing has a not high ultimate tensile strength of about 146.7 MPa and an elongation rate of 16.6%.

Comparative Example 1-2

The commercially available 6061 aluminum alloy object was atomized, sprayed, and cooled to form powder, which was then processed by 3D printing to form an aluminum alloy object. The aluminum alloy object had a lot of cracks, low ultimate tensile strength of 78.3 MPa and an extremely low elongation rate of 0.5%. As shown in Comparative Example 1-2, the commercially available 6061 aluminum alloy was not suitable for 3D printing.

Example 1

The composition of an aluminum alloy A1 was adjusted as follows: 1.8 wt % of Si, 0.4 wt % of Mg, 0.5 wt % of Cu, 1 wt % of Zn, 0.4 wt % of Ti, and the remainder being Al and inevitable impurities. The aluminum alloy A1 was atomized, sprayed, and cooled to form powder, which was then processed by 3D printing to form an aluminum alloy object. The aluminum alloy object had a low ultimate tensile strength of 66.7±17.5 MPa and no elongation rate (brittle and broken).

The composition of an aluminum alloy A2 was adjusted as follows: 1.8 wt % of Si, 0.4 wt % of Mg, 0.5 wt % of Cu, 1.5 wt % of Zn, 0.8 wt % of Ti, and the remainder being Al and inevitable impurities. The aluminum alloy A2 was atomized, sprayed, and cooled to form powder, which was then processed by 3D printing to form an aluminum alloy object. The aluminum alloy object had a high ultimate tensile strength of 216.3±34.8 MPa and a high elongation rate of 10.1±6.9%.

The composition of an aluminum alloy A3 was adjusted as follows: 1.8 wt % of Si, 0.4 wt % of Mg, 0.5 wt % of Cu, 2 wt % of Zn, 1.2 wt % of Ti, and the remainder being Al and inevitable impurities. The aluminum alloy A3 was atomized, sprayed, and cooled to form powder, which was then processed by 3D printing to form an aluminum alloy object. The aluminum alloy object had a high ultimate tensile strength of 262.5±3.4 MPa and a high elongation rate of 22.1±1.0%.

The composition of an aluminum alloy A4 was adjusted as follows: 1.8 wt % of Si, 0.4 wt % of Mg, 1 wt % of Cu, 1 wt % of Zn, 1.2 wt % of Ti, and the remainder being Al and inevitable impurities. The aluminum alloy A4 was atomized, sprayed, and cooled to form powder, which was then processed by 3D printing to form an aluminum alloy object. The aluminum alloy object had a high ultimate tensile strength of 277.1±2.9 MPa and a high elongation rate of 17.7±0.8%.

The composition of an aluminum alloy A5 was adjusted as follows: 1.8 wt % of Si, 0.4 wt % of Mg, 1 wt % of Cu, 1.5 wt % of Zn, 0.4 wt % of Ti, and the remainder being Al and inevitable impurities. The aluminum alloy A5 was atomized, sprayed, and cooled to form powder, which was then processed by 3D printing to form an aluminum alloy object. The aluminum alloy object had a low ultimate tensile strength of 118.5±11.2 MPa and a low elongation rate of 4.6±1.4%.

The composition of an aluminum alloy A6 was adjusted as follows: 1.8 wt % of Si, 0.4 wt % of Mg, 1 wt % of Cu, 2 wt % of Zn, 0.8 wt % of Ti, and the remainder being Al and inevitable impurities. The aluminum alloy A6 was atomized, sprayed, and cooled to form powder, which was then processed by 3D printing to form an aluminum alloy object. The aluminum alloy object had a high ultimate tensile strength of 276.3±3.8 MPa and a high elongation rate of 20.0±1.8%.

The composition of an aluminum alloy A7 was adjusted as follows: 1.8 wt % of Si, 0.4 wt % of Mg, 1.5 wt % of Cu, 1 wt % of Zn, 0.8 wt % of Ti, and the remainder being Al and inevitable impurities. The aluminum alloy A7 was atomized, sprayed, and cooled to form powder, which was then processed by 3D printing to form an aluminum alloy object. The aluminum alloy object had a high ultimate tensile strength of 286.7±3.9 MPa and a high elongation rate of 17.4±1.4%.

The composition of an aluminum alloy A8 was adjusted as follows: 1.8 wt % of Si, 0.4 wt % of Mg, 1.5 wt % of Cu, 1.5 wt % of Zn, 0.4 wt % of Ti, and the remainder being Al and inevitable impurities. The aluminum alloy A8 was atomized, sprayed, and cooled to form powder, which was then processed by 3D printing to form an aluminum alloy object. The aluminum alloy object had a low ultimate tensile strength of 147.9±24.2 MPa and a low elongation rate of 5.8±1.5%.

The composition of an aluminum alloy A9 was adjusted as follows: 1.8 wt % of Si, 0.4 wt % of Mg, 1.5 wt % of Cu, 2 wt % of Zn, 1.2 wt % of Ti, and the remainder being Al and inevitable impurities. The aluminum alloy A9 was atomized, sprayed, and cooled to form powder, which was then processed by 3D printing to form an aluminum alloy object. The aluminum alloy object had a high ultimate tensile strength of 286.2±3.2 MPa and a high elongation rate of 16.7±0.1%.

Example 2

The composition of an aluminum alloy B1 was adjusted as follows: 1.8 wt % of Si, 0.4 wt % of Mg, 1.5 wt % of Cu, 1 wt % of Zn, 0.4 wt % of Ti, and the remainder being Al and inevitable impurities. The aluminum alloy B1 was atomized, sprayed, and cooled to form powder, which was then processed by 3D printing to form an aluminum alloy object. The aluminum alloy object had a low ultimate tensile strength of 103.4±6.8 MPa and a low elongation rate of 5.5±1.8%.

The composition of an aluminum alloy B2 was adjusted as follows: 1.8 wt % of Si, 0.4 wt % of Mg, 1.5 wt % of Cu, 1 wt % of Zn, 0.8 wt % of Ti, and the remainder being Al and inevitable impurities. The aluminum alloy B2 was atomized, sprayed, and cooled to form powder, which was then processed by 3D printing to form an aluminum alloy object. The aluminum alloy object had a high ultimate tensile strength of 286.7±3.9 MPa and a high elongation rate of 17.4±1.4%.

The composition of an aluminum alloy B3 was adjusted as follows: 1.8 wt % of Si, 0.4 wt % of Mg, 1.5 wt % of Cu, 1 wt % of Zn, 1.2 wt % of Ti, and the remainder being Al and inevitable impurities. The aluminum alloy B3 was atomized, sprayed, and cooled to form powder, which was then processed by 3D printing to form an aluminum alloy object. The aluminum alloy object had a high ultimate tensile strength of 298.4±5.7 MPa and a high elongation rate of 18.1±3.9%.

The composition of an aluminum alloy B4 was adjusted as follows: 1.8 wt % of Si, 0.4 wt % of Mg, 1.5 wt % of Cu, 1 wt % of Zn, 1.6 wt % of Ti, and the remainder being Al and inevitable impurities. The aluminum alloy B4 was atomized, sprayed, and cooled to form powder, which was then processed by 3D printing to form an aluminum alloy object. The aluminum alloy object had a high ultimate tensile strength of 311.5±5.9 MPa and a high elongation rate of 14.5±2.8%.

The composition of an aluminum alloy B5 was adjusted as follows: 1.8 wt % of Si, 0.4 wt % of Mg, 1.5 wt % of Cu, 1 wt % of Zn, 2.0 wt % of Ti, and the remainder being Al and inevitable impurities. The aluminum alloy B5 was atomized, sprayed, and cooled to form powder, which was then processed by 3D printing to form an aluminum alloy object. The aluminum alloy object had a high ultimate tensile strength of 330.1±15.9 MPa and a moderate elongation rate of 8.9±4.1%.

Example 3

The composition of an aluminum alloy C1 was adjusted as follows: 1.8 wt % of Si, 0.4 wt % of Mg, 1.5 wt % of Cu, 1 wt % of Zn, 1.2 wt % of Ti, and the remainder being Al and inevitable impurities. The aluminum alloy C1 was atomized, sprayed, and cooled to form powder, which was then processed by 3D printing to form an aluminum alloy object. The aluminum alloy object had a high ultimate tensile strength of 298.4±5.7 MPa and a high elongation rate of 18.1±3.9%.

The composition of an aluminum alloy C2 was adjusted as follows: 1.8 wt % of Si, 0.4 wt % of Mg, 1.5 wt % of Cu, 1.5 wt % of Zn, 1.2 wt % of Ti, and the remainder being Al and inevitable impurities. The aluminum alloy C2 was atomized, sprayed, and cooled to form powder, which was then processed by 3D printing to form an aluminum alloy object. The aluminum alloy object had a high ultimate tensile strength of 289.5±3.2 MPa and a high elongation rate of 17.9±4.3%.

The composition of an aluminum alloy C3 was adjusted as follows: 1.8 wt % of Si, 0.4 wt % of Mg, 1.5 wt % of Cu, 2 wt % of Zn, 1.2 wt % of Ti, and the remainder being Al and inevitable impurities. The aluminum alloy C3 was atomized, sprayed, and cooled to form powder, which was then processed by 3D printing to form an aluminum alloy object. The aluminum alloy object had a high ultimate tensile strength of 293.8±4.9 MPa and a high elongation rate of 16.7±2.1%.

Example 4

The aluminum alloy objects formed by 3D printing the powder of the aluminum alloys A2, A3, A4, A6, A7, A9, and C1 were anodized to form anodized films on the aluminum alloy objects, respectively. Alternatively, the 6061 aluminum alloy object was anodized to form an anodized film on the aluminum alloy object. The aluminum alloy objects with the anodized film thereon were dipped in an aqueous solution of sodium chloride (3.5 wt %) to measure their corrosion resistance (measured according to the standard ASTM G44). The aluminum alloy object (A2) with the anodized film had a corrosion current density of $9.93 \times 10^{-6}$ A/cm$^2$, the aluminum alloy object (A3) with the anodized film had a corrosion current density of $6.19 \times 10^{-6}$ A/cm$^2$, the aluminum alloy object (A4) with the anodized film had a corrosion current density of $4.19 \times 10^{-6}$ A/cm$^2$, the aluminum alloy object (A6) with the anodized film had a corrosion current density of $4.02 \times 10^{-6}$ A/cm$^2$, The aluminum alloy object (A7) with the anodized film had a corrosion current density of $3.25 \times 10^{-6}$ A/cm$^2$, The aluminum alloy object (A9) with the anodized film had a corrosion current density of $3.48 \times 10^{-6}$ A/cm$^2$, The aluminum alloy object (C1) with the anodized film had a corrosion current density of $3.25 \times 10^{6}$ A/cm$^2$, and the aluminum alloy object (6061) with the anodized film had a corrosion current density of $1.09 \times 10^{-5}$ A/cm$^2$, In general, the lower corrosion current density means the better corrosion resistance effect of the anodized film. As shown in the above comparison, the anodized films formed from the aluminum alloys in Examples of the disclosure had better corrosion resistance than the anodized film formed from the conventional 6061 aluminum alloy.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An aluminum alloy material, wherein the aluminum alloy material comprises:
   1.6 wt % to 2.0 wt % of Si;
   0.3 wt % to 0.5 wt % of Mg;
   0.5 wt % to 1.5 wt % of Cu;
   1.0 wt % to 2.0 wt % of Zn;
   0.8 wt % to 1.6 wt % of Ti; and
   the remainder being Al and inevitable impurities.

2. An aluminum alloy object, formed by processing a powder of the aluminum alloy material as claimed in claim 1.

3. The aluminum alloy object as claimed in claim 2, wherein the powder of the aluminum alloy material has a diameter of 20 micrometers to 65 micrometers.

4. The aluminum alloy object as claimed in claim 2, wherein the processing comprises 3D printing, die casting, forging, welding, or milling.

5. The aluminum alloy object as claimed in claim 2, further comprising an anodized film formed on the surface of the aluminum alloy object.

6. A method of forming an aluminum alloy object, comprising:
   processing a powder of the aluminum alloy material as claimed in claim 1 to form the aluminum alloy object.

7. The method as claimed in claim 6, wherein the powder of the aluminum alloy material has a diameter of 20 micrometers to 65 micrometers.

8. The method as claimed in claim 6, wherein the processing comprises 3D printing, die casting, forging, welding, or milling.

9. The method as claimed in claim 6, further comprising anodizing the aluminum alloy object to form an anodized film on the surface of the aluminum alloy object.

* * * * *